United States Statutory Invention Registration [19]

[11] Reg. Number: H172

Pribyl et al. [43] Published: Dec. 2, 1986

[54] AIR PURGE SYSTEM FOR VEHICLE ENGINE EXHAUST SMOKE SYSTEMS

[75] Inventors: William J. Pribyl, Baltimore; Donald L. Curtis, Edgewood, both of Md.

[73] Assignee: The United States of America as represented by the Secretary of the Army, Washington, D.C.

[21] Appl. No.: 845,668

[22] Filed: Mar. 26, 1986

[51] Int. Cl.[4] ..... C09K 3/30; C06D 3/00; F41H 9/06

[52] U.S. Cl. ..... 252/305; 102/334; 89/1.11; 89/36.01

*Primary Examiner*—Deborah L. Kyle
*Assistant Examiner*—Michael J. Carone
*Attorney, Agent, or Firm*—Anthony T. Lane; Robert P. Gibson; Michael C. Sachs

[57] ABSTRACT

An air purge system device for use with nozzle tubes carrying fuel oil to a diesel engine exhaust system for vaporization of the fuel oil. Provided is at least one nozzle tube for carrying fuel oil to the diesel engine exhaust system and an electrically controlled solenoid valve for controlling flow of fuel from a fuel supply source for the diesel engine to the nozzle tubes. An air purge line is provided for forcing air into the tube from the diesel engine air box. A one-way check valve is provided to permit air flow from the air purge line to the tube and prevent fuel flow from the fuel valve to the air purge line.

The method described prevents coke build-up in nozzle tubes carrying the fuel oil, which fuel is vaporized during operation of a fuel supply valve. The method contemplates supplying air under pressure from a positive pressure air source to an air purge line positioned to force air into the nozzle tubes when fuel supply valve is closed and regulating flow in the air purge line by a one-way check valve on the purge line which permits air flow towards the tube and prevents fuel flow in the air purge line. Operation of the device in engine compartments having an operating temperature above the vaporization temperature of fuel oil purges the nozzle tubes and cools the interior of the nozzle tubes to prevent coking by volatilization of residual fuel oil in the system after the supply has been turned off.

20 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR PURGE SYSTEM FOR VEHICLE ENGINE EXHAUST SMOKE SYSTEMS

GOVERNMENTAL INTEREST

The invention described herein may be made, used, or licensed by the Government for Governmental purposes, without the payment to me of any royalties thereon.

BACKGROUND AND FIELD OF THE INVENTION

For various reasons, systems have been designed to vaporize fuel oil in the exhaust system of internal combustion engines. One such system relates to onboard smoke generating systems for military vehicles such as tanks and the like.

In these systems, a portion of the engine diesel fuel in injected into the exhaust manifold where the fuel is vaporized and where the vaporized fuel exits with the exhaust gasses. As this vapor is cooled by ambient air as it exits the exhaust pipe, a dense smoke screen is provided that obscures the tank or other vehicle from visual observation.

When such a system is turned off, the residual fuel remaining in the nozzle tubes is vaporized because the temperature in the engine compartment is normally above the boiling point of the fuel. Once the volatile portion of the fuel is gone, a residue remains which is comprised primarily of carbon. There is a gradual build up of carbon after each activation of the system and build-up is referred to as "coking". The build-up of coke is a gradual process and continues until the nozzle tubes become partially or completely blocked. These nozzle tubes, which are normally manufactured from stainless steel, must then be replaced in order to return the system to operational readiness. Maintenance procedures require inspection of the tubes on a regular basis where replacement is made when blockage is found. Of course, frequent replacement involves an unnecessary cost whereas if the system tubes are changed only when the system fails to generate smoke, that blockage would prevent smoke generation which may occur at a time when visual screening is important and possibly even necessary for survival.

As practiced, the visual inspection is undesirable because it is a go, no-go situation since equipment necessary to determine the flow rate through nozzle tubes cannot be provided in the field. While it has not been heretofore possible, elimination of the inspection and replacement maintenance procedure would be most desirable. Particularly desirable would be a system which would prevent the coking build-up in the nozzle tubes to thereby eliminate the need for inspection.

SUMMARY OF THE INVENTION

It has now been discovered that coking can be prevented in nozzle tubes carrying fuel oil to an engine exhaust system for fuel oil vaporization. The invention comprises an air purge system device for use when there is a supply valve for controlling the flow of fuel to the nozzle tubes from a fuel supply source. The system includes an air purge line for forcing air into the tube when the supply valve is closed. Also provided is a one-way check valve on the air purge line which permits air flow towards the tube and prevents fuel flow in said air purge line. An air supply source having a positive air pressure is connected to supply air to the air purge line.

In a preferred embodiment, the engine system used is a diesel engine and the fuel supply source is the diesel engine fuel supply. The diesel engine, whether comprised of an aluminum block engine or an iron block engine, has an engine air box which may be used as the air source since air supply from that air box is at least 5 psi. Gas turbine engines are also included in this system, as the exhaust system and air supply systems are functionally equivalent for the purposes of this invention.

In a preferred embodiment, a mixing tee line is adapted to receive fuel from the fuel valve and to receive air from the check valve. Both air and fuel are transmitted from the tee to the nozzle tube.

Thus the present invention functions as a method for preventing coke build-up in nozzle tubes carrying a fuel oil to an engine exhaust system for vaporization. This system has at least one nozzle tube supplying fuel oil to an engine exhaust system from a supply valve for controlling flow of fuel to said nozzle tubes. The nozzle tubes and remaining portions of the system are in an engine compartment having an operating temperature above the vaporization temperature of the fuel oil. The method includes the steps of supplying air under pressure from a positive pressure air source to an air purge line which is positioned to force air into the nozzle tubes when the fuel supply valve is closed. The flow in the air purge line is regulated by a one-way check valve on the purge line which permits air flow toward the tube and prevents fuel flow in the air purge line.

OBJECTS OF THE INVENTION

Accordingly, it is an object of this invention to provide a system for preventing coking in nozzle tubes which carry fuel oil to an engine exhaust system for fuel oil vaporization.

Another object of this invention is to provide an exhaust smoke system which eliminates the need for visual inspection of the exhaust tubes.

Yet another object of this invention is to provide such a system for use with diesel engines in which only a minor amount of modification of the engine and exhaust system is required.

BRIEF DESCRIPTION OF THE DRAWINGS

The forgoing embodiments of this invention and the particular features of the various alternative embodiments will be more clearly understood from the following detailed description thereof, which is read in conjunction with the accompanying drawings, in which.

DETAILED DESCRIPTION OF THE INVENTION

In general, the operation of the present invention comprises the use of a source of air which is obtained from a vehicle engine and which is piped through a low pressure check valve that is connected to the fuel injection nozzle for the carrying of the fuel oil to an engine exhaust system for vaporization. The air is a continuous source flowing through a one-way check valve which is opened at relatively low pressure, such as about 5 psi. When oil is not flowing to the nozzle tubes, air is constantly flowing through the nozzle tube such that the flow within the tube acts as a coolant and keeps the nozzles from reaching the temperature of the engine compartment. Normal engine compartments have an ambient temperature which is in excess of the vaporization temperature of fuel oil. Of course, when the supply valve is activated and fuel flows through the nozzle tubes, the flow of fuel through the nozzle also acts as a coolant to prevent the insides of the nozzle tubes from reaching the temperature of the engine compartment.

When the fuel pressure is engaged, at a substantially higher pressure than the operation pressure for the check valve, the air check valve closes and prevents flow of fuel down the air purge line. Typically, fuel pressures of at least 20 psi are used and preferably at least 45 psi when engine fuel pumps are used to supply the fuel under pressure. Thus, the nozzle tubes when in operation are subjected to either the flow of air or the flow of fuel and thus the inside of the nozzle tube never reaches engine compartment temperature. As soon as the oil pressure is released, the low pressure check valve is activated and air once again flows through the tube, flushing the oil from the system, preventing build-up of residual fuel in the nozzle tubes, and totally eliminating the coking problem.

Figure 1:
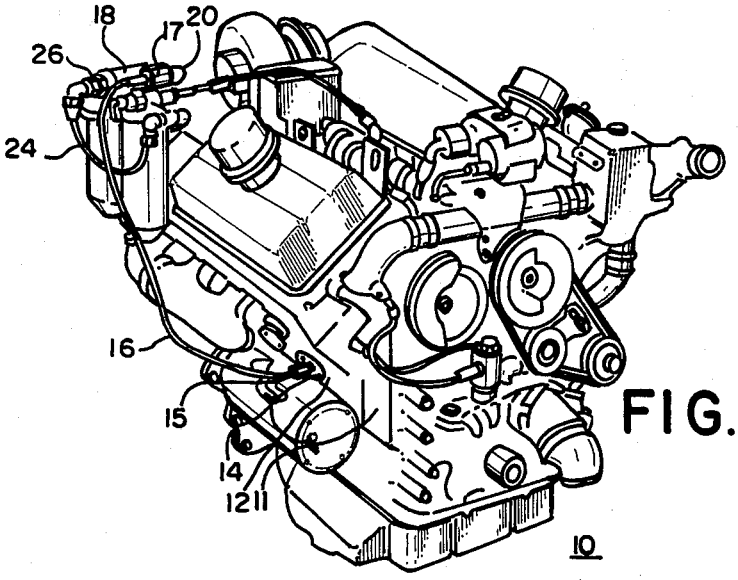
FIG. 1 is perspective view of a diesel engine fitted with a preferred embodiment of the present invention.

As shown in FIG. 1, a diesel engine 10 shown generally is typical of the engines used to power armored personal carriers and other combat vehicles which might employ a system for supplying fuel oil to an engine exhaust system for vaporizing the fuel. Located within the engine block 11, which may be either a cast iron block or an aluminum block, as both are standard in the diesel engine industry, is a connector plate 14 which allows a connector 15 to be inserted into the engine air box 12. Specific details of the connection are discussed below with reference to FIGS. 3A and 3B. In conventional diesel engines, excess air from the supercharger is discharged in the engine block cavity through the air box and access to that air may be made through the air box cover. Normally, covers are located on each side of the engine and the particular design and convenience of installation is left to selection based upon the particular engine being used. When aluminum block engines are used, a hole may be drilled and tapped into the center of the cover. For cast iron block engines, the center bolt holding the right front air box cover may be replaced with a flow through bolt.

Of course it is realized that the component of this air purge system does not require that the air come from the engine. A supply of continuous air is needed, and should be such as to meet military or other safety specifications for use in an engine compartment but may be any source of air as long as it is continuous and has positive pressure so as to operate the check valve.

Air flows from the connector 15 through an air purge line 16 into a check valve 17. The system is supported by a mounting bracket 18 located on the engine 10.

Figure 2:
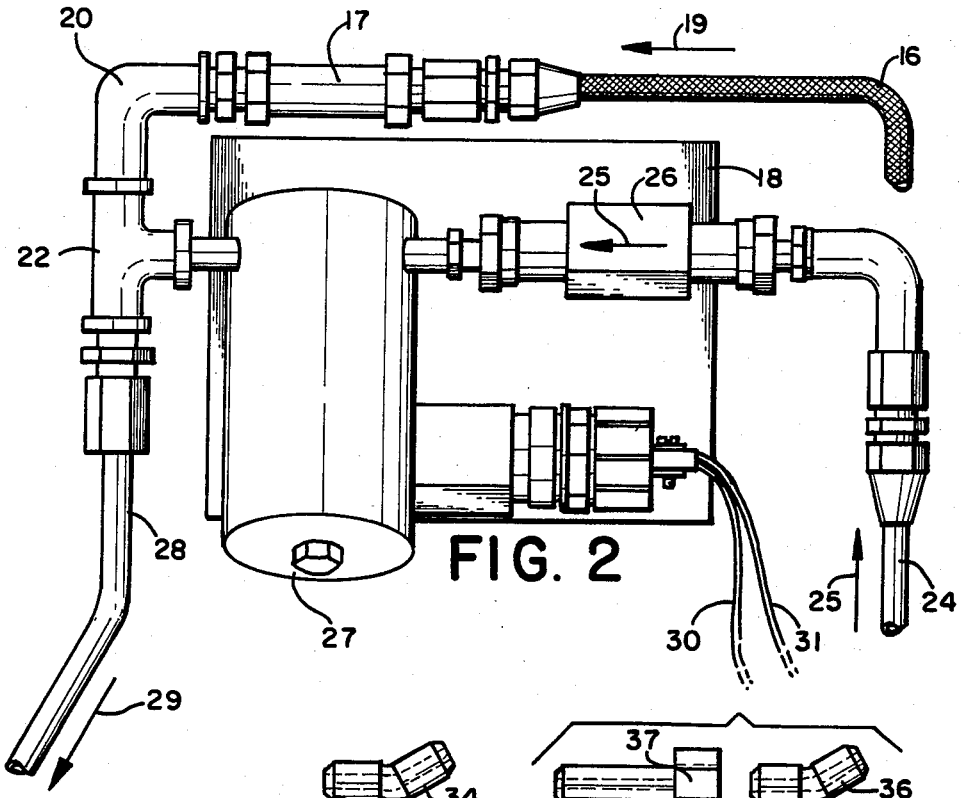
FIG. 2 is a schematic view of a preferred embodiment shown in FIG. 1.

As shown in FIG. 2, air from line 16 passes through check valve 17 in the direction of arrow 19. Air leaves the check valve 17 through elbow 20 and flows into a tee 22 and throughout the system as will be described. When the engine is operating, the air flows through check valve 17 continuously unless it is closed.

Figure 4:
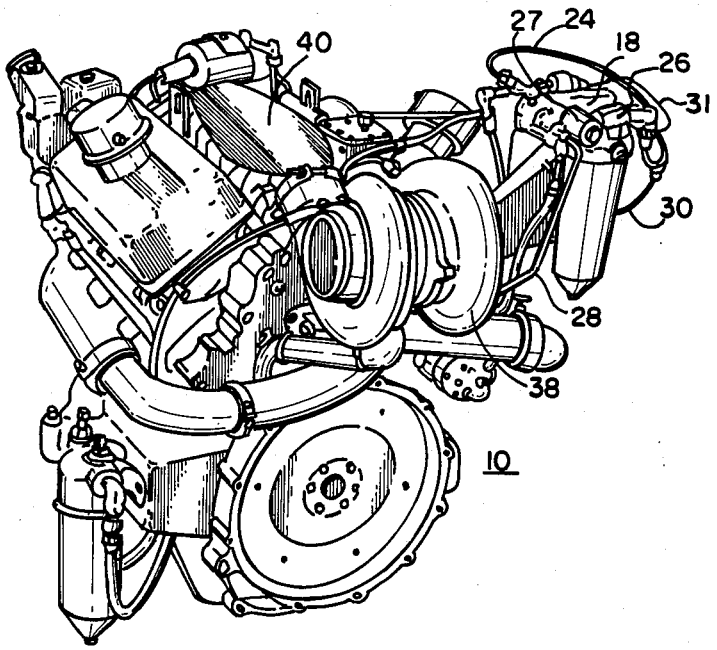
FIG. 4 is a perspective view of the other end of the engine shown in FIG. 1.

Fuel oil flows through line 24 in the direction of arrow 25 as shown in FIG. 2 and into a manual shut-off valve 26. This manual shut-off valve 26 permits independent control of the system. Operational control is accomplished through the use of solenoid valve 27 which controls the flow of fuel oil from line 24 through the manual valve 26 into the tee 22. Oil then flows into elbow 20, thereby causing check valve 17 to close. Oil also flows from the tee 22 into nozzle tube 28 in the direction of arrow 29 so as to provide oil to an engine exhaust system for vaporization. That engine exhaust system is shown generally in engine 10 and is connected to the discharge end of fuel nozzle 28. Flow of fuel through the solenoid valve 27 is controlled by electrical leads 30 and 31, leading to control switches (not shown). Fuel nozzle 28 is shown in FIG. 4 on the back or other side of engine 10 in which fuel enters the exhaust system as described.

Figure 3A:
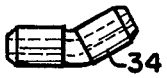
FIGS. 3A and 3B are two alternative embodiments for connecting the preferred embodiment to various diesel engines.
Figure 3B:
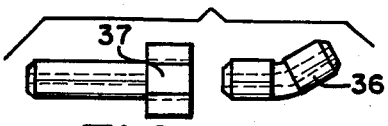

As has been previously stated, the connection to the engine air box 12 is made through connector plate 14 and connector 15. As shown in FIG. 3A, a 45° elbow 34 is placed in the hole which has been drilled and tapped in the center of the air cover plate 14 for the aluminum block engine. Connector 15 fits in elbow 34. When a cast iron block engine is employed, a 45° elbow 36 is fitted into a hollow hex head bolt 37 as shown in FIG. 3B which replaces the center bolt holding the right front air box cover plate 14 in place. Connector 15 then fits in elbow 36. In either case, connection is made from the air box via connector 15 to line 16 which functions as the air purge line as previously described.

When properly installed as described herein, the present invention functions to prevent coking of nozzle tubes carrying fuel oil to an engine exhaust system for vaporization of the fuel oil. Fuel flows from the fuel tanks of the engine through a line 24 and is regulated by solenoid valve 27. When it is desired to vaporize fuel oil, such as to provide a smoke screen, oil flows into tee 22 through nozzle tube 28 into the exhaust system of the engine in the direction of arrow 29. When the solenoid valve 27 is closed, shutting off the flow of fuel, check valve 17, which has been preventing flow of fuel through it, now opens under the moderate air pressure in line 16 to allow air pressure to flow in the direction of arrow 19, thereby flushing elbow 20, tee section 22 and nozzle tube 28. Thus no oil is allowed to build-up in the system and coking is prevented. Moreover, residual oil which might tend to coat the interior of elbow 20 or tube 22 or nozzle tube 28 is prevented from vaporizing to form coke because the flow of air is insufficient to keep the temperature of the components below the vaporization temperature of the fuel oil. When air is not flowing through these components, fuel oil is flowing and thus both the air and the fuel oil cooperatively prevent coking.

Having thus described the invention, what is claimed is:

1. An air purge system device for use with nozzle tubes carrying a fuel oil to an engine exhaust system for vaporization of the fuel oil, comprising:

at least one nozzle tube for carrying fuel oil to an engine exhaust system;

a supply valve for controlling flow of fuel to said nozzle tube;

an air purge line for forcing air into said tube when said air supply valve is closed;

a one-way check valve on said air purge line permitting air flow toward said tube and preventing fuel flow in said air purge line;

an air source having a positive air pressure and connected to supply air to said air purge line; and a fuel supply source connected to supply fuel to said supply valve.

2. The device of claim 1 wherein a said engine exhaust system is part of a diesel engine.

3. The device of claim 2 wherein the fuel supply source for said diesel engine supplies fuel to said supply valve.

4. The device of claim 2 wherein said air source is an engine air box on said diesel engine for supplying a positive air pressure.

5. The device of claim 4 wherein said air source supplies air under pressure of at least 5 psi.

6. The device of claim 5 wherein said fuel supply pressure is at least 20 psi.

7. The device of claim 2 which further includes a mixing tee line adapted to receive fuel from said supply valve and receive air from said air check valve and transmit air and fuel to said nozzle tube.

8. The device of claim 4 wherein said diesel engine has an aluminum block and said air source is connected to the engine air block through the air box cover.

9. The device of claim 4 wherein said diesel engine has a cast iron block and said air source is connected to the engine air box through said air box cover.

10. The device of claim 2 which further includes manual shut-off valve means for controlling the flow of fuel.

11. The device of claim 2 wherein said supply valve is an electrically controlled solenoid valve.

12. An air purge system device for use with nozzle tubes carrying fuel oil to diesel engine exhaust systems for evaporation of said fuel oil, comprising:

at least one nozzle tube for carrying fuel oil to diesel engine exhaust system;

an electrically controlled solenoid valve for controlling flow of fuel from a fuel supply source for said diesel engine to said nozzle tube;

an air purge line for forcing air into said tube from said diesel engine air box; and a one-way check valve on said air purge line permitting air flow towards said tube and preventing air fuel flow in said air purge line.

13. A method of preventing coke build-up in nozzle tubes carrying fuel oil to an engine exhaust system for vaporization of the fuel oil, in which system at least one nozzle tube supplies fuel oil to an engine exhaust system from a supply valve for controlling flow of fuel to said nozzle in an engine compartment having an operating temperature above the vaporization temperature of the fuel oil, comprising the steps of:

supplying air under pressure from a positive air source to an air purge line positioned to force air into said nozzle tube when said fuel supply valve is closed, and regulating flow in said air purge line by a one-way check valve on said purge line permitting air flow toward the tube and preventing fuel flow in said air purge line.

14. The method of claim 13 wherein the engine exhaust system is part of a diesel engine or gas turbine engine.

15. The method of claim 14 wherein said air source is an engine air box on said diesel engine or bleed air from a gas turbine.

16. The method of claim 15 wherein said air source supplies pressure of air at least 5 psi.

17. The method of claim 14 wherein said fuel supply pressure is at least 20 psi.

18. The method of claim 14 which further includes a tee line wherein fuel is received from said supply valve in said tee and air is received from said check valve in said tee and both air and fuel are transmitted from said tee to said nozzle tube.

19. The method of claim 15 wherein said diesel engine has an aluminum block and said air source is connected to the engine air box through the air box cover.

20. The method of claim 15 wherein said diesel engine has a cast iron block and the air supply source is connected to the engine air box through the air box cover.

* * * * *